Aug. 23, 1966    A. E. ECKERMANN, JR    3,268,185
LIGHT SENSING DEVICE
Filed April 2, 1962    3 Sheets-Sheet 1
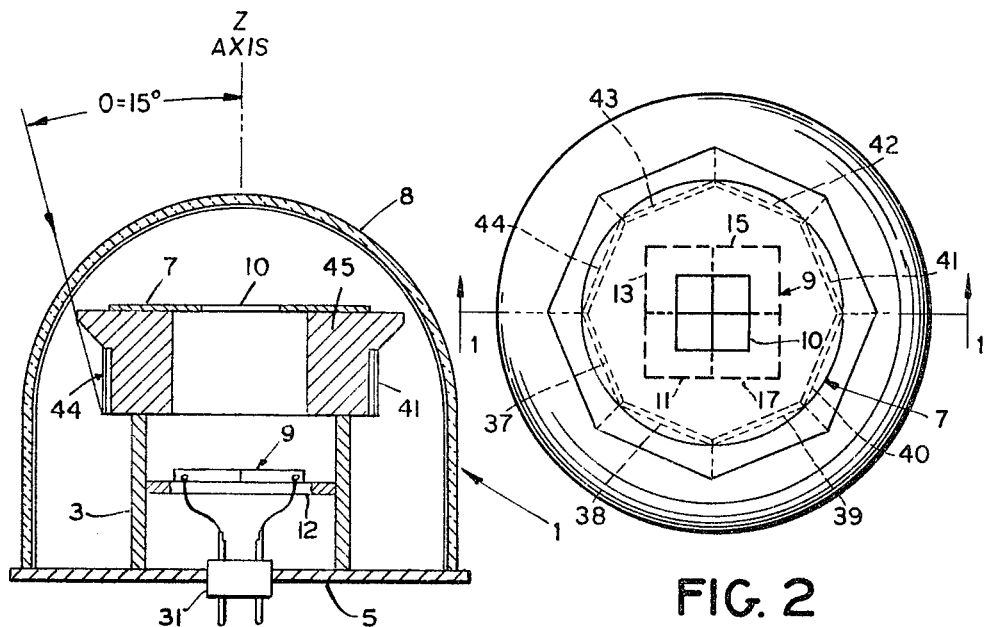
FIG. 1
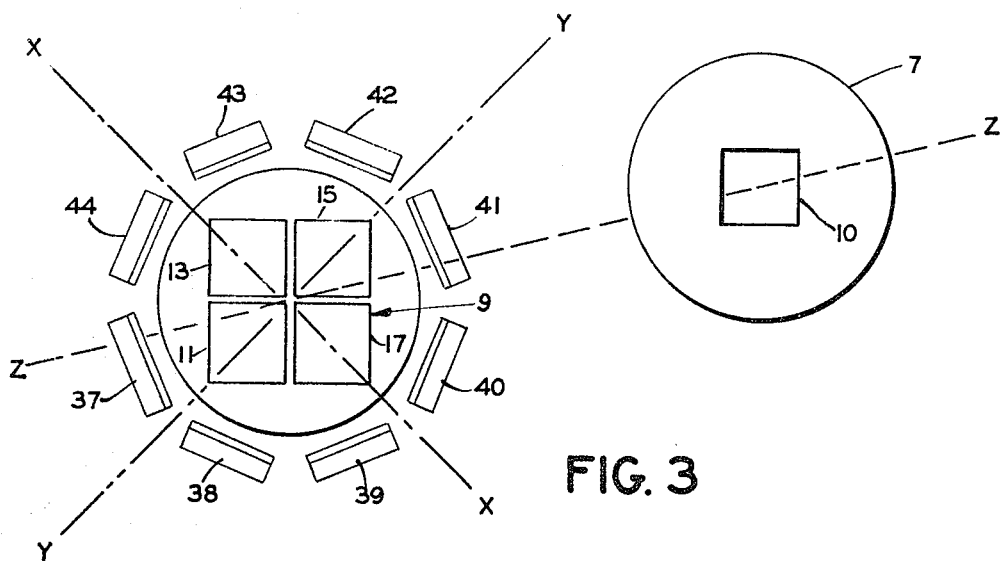
FIG. 2
FIG. 3
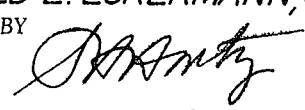
INVENTOR.
ALFRED E. ECKERMANN, JR.
BY
ATTORNEY United States Patent Office 3,268,185
Patented August 23, 1966

3,268,185
LIGHT SENSING DEVICE
Alfred E. Eckermann, Jr., Hasbrouck Heights, N.J., assignor to The Bendix Corporation, Teterboro, N.J., a corporation of Delaware
Filed Apr. 2, 1962, Ser. No. 184,429
20 Claims. (Cl. 244—77)

The invention relates to light sensing devices and more particularly to a light sensing device for controlling orientation of an object relative to the sun or other light source.

The sensing device of the present invention is particularly adapted to establish a reference for the attitude control of space vehicles. When a vehicle is propelled into space, the vehicle tumbles at random and must be oriented to a desired attitude in space relative to a preselected reference. When the sun is used as the reference, the sensor must locate the sun over a substantial solid angle and thereafter accurately track the sun to control the attitude of the vehicle. Sun sensors as used heretofore have a small sun locating range and in addition they are bulky, heavy and unreliable in operation.

One object of the present invention is to provide a reliable, light weight, compact, light sensing device which locates a light source, such as the sun, over a large solid angle.

Another object of the invention is to provide a light sensing device having an arrangement for locating the sun over a large solid angle and another arrangement for tracking the sun within a small solid angle.

Another object of the invention is to convert light signals into control signals corresponding to the attitude of the light sensing device relative to the light source.

Another object of the invention is to provide control signals which are linearly proportional to the attitude of the light sensing device relative to the light source within a predetermined range.

Another object of the invention is to provide signals which have a positive slope for zenith angular displacement of the vehicle between 0 and ±90 degrees for all azimuth angular displacements from 0 to 360 degrees.

The invention contemplates a light sensing device comprising light sensitive means providing electrical signals when exposed to light, the light sensitive means including a plurality of light sensitive elements arranged to receive light rays over a substantial solid angle and a plurality of light sensitive elements arranged to receive light rays within a relatively small solid angle, said elements being connected to provide electrical signals corresponding to the attitude of the light sensing device relative to the light source.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

In the drawings:

FIGURE 1 is a side view partially in section of a novel light sensing device constructed according to the invention.

FIGURE 2 is a top view of the device.

FIGURE 3 is a diagrammatic exploded view of the device.

Figure 5:
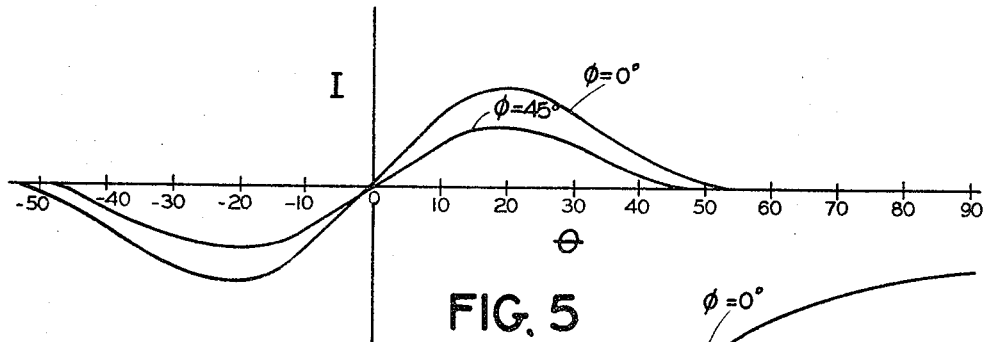
Figure 6:
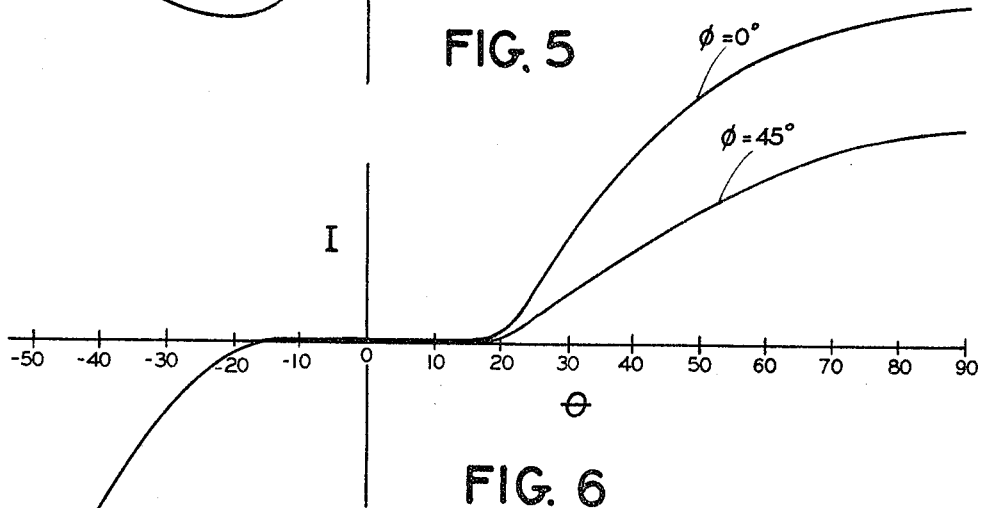
Figure 7:
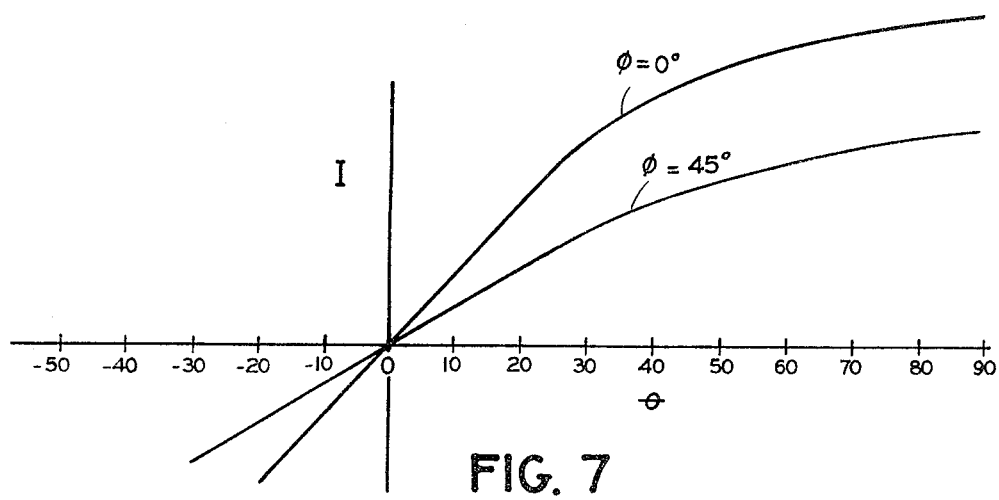

FIGURES 5, 6, and 7 show graphs of control signal outputs I plotted against zenith angular deflections $\theta$ for various azimuth angle $\phi$.

Figure 8:
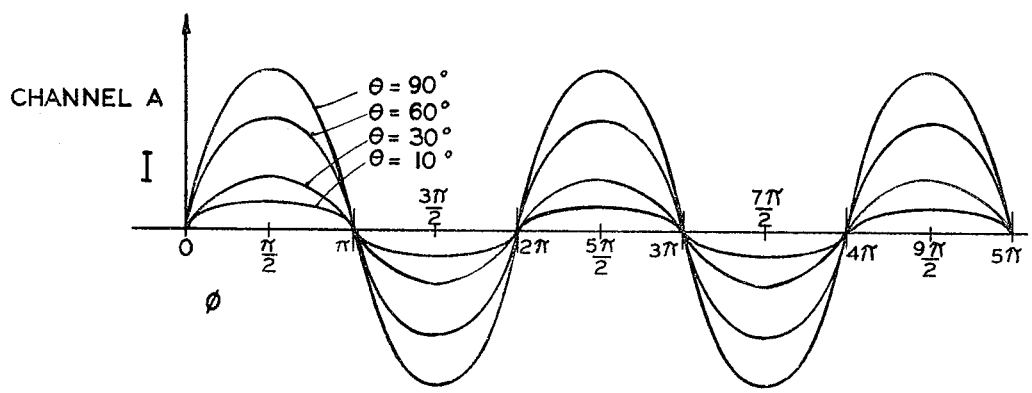
Figure 8:
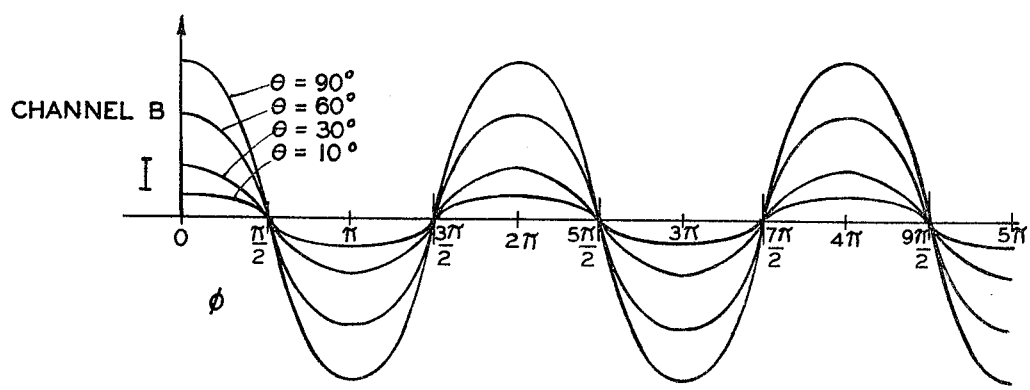

FIGURE 8 shows graphs of control signal outputs I plotted against azimuth angular deflections $\phi$ for various zenith angles $\theta$.

Referring to the drawings and more particularly to FIGURES 1 to 3, shown therein is a novel light sensing device 1 constructed according to the present invention. The device may be fixed to the vehicle in which it is mounted and comprises a support 3 mounted on a disc-like base 5. A dome 8 also is mounted on base 5 and preferably is coated with evaporated material to allow only about 10 percent light transmission. The dome may be evacuated so that no pressure differential exists when the vehicle is in outer space.

A light sensitive detector 9 is positioned concentrically within support 3 and is secured to a disc-like member 12. Detector 9 is divided into four square segments 11, 13, 15, 17, of equal area. Each segment 11, 13, 15, 17 may comprise a voltage detecting element such as selenium, silicon, or cadmium sulfide, which generates a voltage or current when exposed to light. Opposed segments 11, 15 and 13, 17 are connected together in opposition to one another. Segments 11 and 15 provide signals for controlling the attitude of the vehicle about an axis X and segments 13 and 17 provide signals for controlling the attitude of the vehicle about an axis Y at right angles to the X axis. A disc 7 mounted on support 3 has a concentric square aperture 10 therein to provide for transmission of light from the sun or other light source onto light sensitive detector 9.

When the light source is coincident with the axis of light sensing device 1, referred to hereafter as the Z axis, light from the source is directed through aperture 10 and is centered on detector 9, equally illuminating the four segments 11, 13, 15, and 17. Under this condition, equal voltages or currents are generated by the segments and the net output is zero. When the light source is not coincident with the Z axis, light from the source is directed through aperture 10 and illuminates the segments unequally and the more highly illuminated segment or segments generate a higher voltage or current than the opposite segment or segments. The Z axis, it will be observed, is perpendicular to the plane of the X, Y axes.

The output from segments 11 and 15 for controlling movement of the vehicle about the X axis is shown in FIGURE 5 and the output simulates a sine wave from 0 to 10 degrees and is substantially linear in that range. The curves show current output I plotted against zenith angle $\theta$ for azimuth angles $\phi$ of 0 degrees and 45 degrees. The zenith angle $\theta$ is the angle between the Z axis and the incident light rays and the azimuth angle $\phi$ is the angle of rotation about the Z axis using the X axis as 0 degrees. It will be observed that the amplitude of the output from segments 11 and 15 varies with the azimuth position of the detector, when the zenith angle is not zero.

The output from segments 13 and 17 for controlling movement of the vehicle about the Y axis is the same as the output from segments 11 and 15 when the azimuth positions are displaced 90 degrees from the positions indicated.

Eight additional light sensitive elements, such as photovoltaic cells 37, 38, 39, 40, 41, 42, 43, and 44 are mounted externally on housing 3 and are arranged octagonally with their light receiving surfaces at right angles to the plane of segments 11, 13, 15, and 17.

Figure 4:
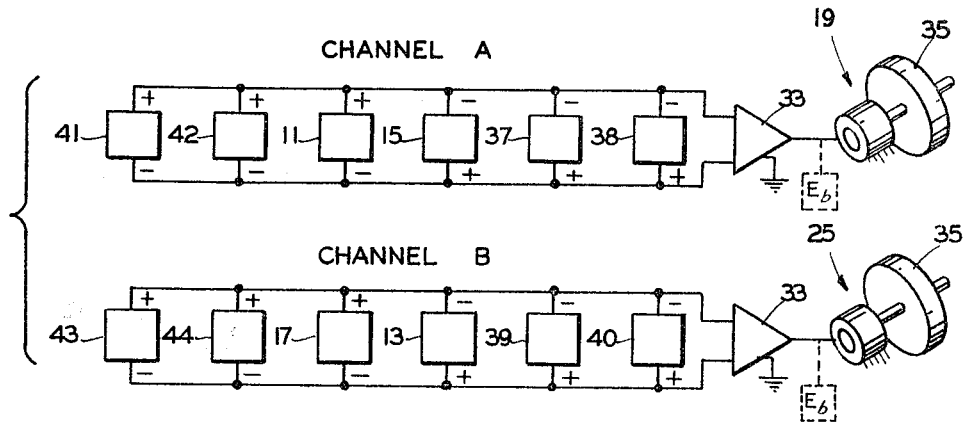
FIGURE 4 is a schematic wiring diagram showing a system for controlling the attitude of a vehicle about two axes.

Cells 37 to 44 are interconnected electrically to cells 11, 13, 15, and 17, as shown schematically in FIGURE 4. Cells 11, 41 and 42 are connected in parallel in aiding relationship and cells 15, 37, and 38 are connected in parallel in aiding relationship, but the latter group of cells are connected in parallel opposition to the first group of cells. Similarly, cells 17, 43, and 44 are connected in parallel in aiding relationship and cells 13, 39, 40 are connected in parallel in aiding relationship, but the latter group of cells are connected in parallel opposition to the first group of cells. Cells 11, 41, 42, 15, 37, and 38 are referred to hereafter as channel A, and cells 17, 43, 44, 13, 39, 40 are referred to hereafter as channel B.

Channel A is connected to suitable control equipment 19 for controlling the attitude of the vehicle about the X axis. Channel B is connected to suitable control equipment 25 for controlling the attitude of the vehicle about the Y axis. An external connector 31 (FIGURE 1) for connection to control equipment 19, 25 is mounted on disc 5. Control equipment 19, 25 (FIGURE 4) may comprise an amplifier 33 and a reaction wheel 35 for orienting the vehicle about the associated axis.

Cells 37 to 44 locate the sun or other light source within a total solid angle of $2\pi$ steradians and sense the light source within this angle except for substantially a 15 degree solid angle sensed by segments 11, 13, 15, and 17. Cells 37 to 44 are shielded from the light source within this angle by a shade 45 so that the output from the external cells is zero within the 15 degree solid angle.

The output from cells 41, 42, 37, 38 for controlling movement of the vehicle about the X axis is shown in FIGURE 6. The graphs show current output I plotted against zenith angle $\theta$ for azimuth angles $\phi$ of 0 degrees and 45 degrees. The output from cells 41, 42, 37, 38 is zero for zenith angles $\theta$ less than 15 degrees because the light from the source is shaded from the cells by shade 45 within this angle. The amplitude of the output from cells 41, 42, 37, 38 for zenith angles $\theta$ greater than 15 degrees varies with the azimuth position of the vehicle. The output from cells 39, 40, 43, 44 is the same as the output from cells 37, 38, 41, 42 when the azimuth positions are displaced 90 degrees from the positions indicated.

The sum of the outputs from segments 11 and 15 and from cells 37, 38, 41, and 42 is shown in FIGURE 7 when the azimuth angle $\phi$ is zero degrees and 45 degrees. The output from the segments and cells controls operation of the associated reaction wheel 35 to orient the vehicle about the X axis in a direction to align the Z axis of the light sensing device with the light source. When the zenith angle $\theta$ is less than 15 degrees, shade 45 shields cells 37 to 44 and the output from the cells drops to zero and segments 11, 13, 15, and 17 control the vehicle in the manner described above. Within a zenith angle of about 15 degrees to 50 degrees segments 11, 13, 15 and 17 and cells 37 to 44 cooperate to control orientation of the vehicle. At zenith angles above about 50 degrees the output of cells 11, 13, 15 and 17 is zero and cells 37 to 44 control orientation of the vehicle.

The sum of the outputs from segments 13 and 17 and from cells 39, 40, 43, and 44 are the same as the sum of the outputs from segments 11 and 15 and from cells 37, 38, 41, 42 when the azimuth positions are displaced 90 degrees from the positions indicated. The outputs from segments 13 and 17 and from cells 39, 40, 43 and 44 control operation of the associated reaction wheel 35 to orient the vehicle about the Y axis in a direction to align the Z axis of the light sensing device with the light source.

The light sensing device described herein is reliable, light in weight, compact, and locates the light source over a large solid angle. The light sensing device has one arrangement for locating the sun over a large solid angle and another arrangement for tracking the sun within a small solid angle. The light sensing device converts the light signals into control signals corresponding to the attitude of the light sensing device relative to the light source, and because the device uses a square aperture, the control signals are linearly proportional to the attitude of the light sensing device relative to the light source within a 10 degree solid angle. The signals have a positive slope for zenith angular displacements $\theta$ between 0 and 90 degrees for all azimuth angular displacements $\phi$ between 0 and 360 degrees because of the octagonal arrangement of cells 37 to 44.

The device described herein provides linear current angle characteristics for zenith angle displacements from 0 to 10 degrees for azimuth angles from 0 to 360 degrees with maximum deviations from linearity of less than .5% from 0° to 5° and of less than 1.5% from 5° to 10°.

Evacuating dome 8 prevents water spots due to condensation from forming on the cells and segments while in storage. The dome prevents micrometeorites from damaging the cells and segments and presents a smooth surface which may be aluminized to reflect 90 percent of the incident radiation to reduce the operating temperature of the device since the cells operate better at low temperatures.

The outputs from channels A and B are shown in FIGURE 8 when the azimuth angle $\phi$ varies from 0 to $5\pi$ degrees for zenith angles $\theta$ of 10, 30, 60, and 90 degrees. This information permits the light sensing device to be used to detect rotation of the vehicle about the Z axis when the Z axis is not aligned with the light source or, in other words, when the zenith angle $\theta$ is greater than 0 degrees and less than $\pm90$ degrees. When the vehicle is rotating about the Z axis channels A and B provide alternating outputs displaced in phase by 90 degrees. When the vehicle is not rotating the outputs from channels A and B are constant. This information is useful for indicating and controlling the angular position and rotation of the vehicle by applying the output of channel A or B to a motor of a reaction wheel, as shown in FIGURE 4, for rotating the vehicle about the Z axis.

The vehicle may be rotated about its X and Y axes to any angular position and be maintained in that position by providing bucking voltages E$b$ at the outputs of amplifiers 33, as shown in dotted lines in FIGURE 4, so that each reaction wheel 35 moves the vehicle to an angular position in which the output of the associated channel is equal and opposite to the bucking voltage E$b$. The outputs of channels A and B may be selected from FIGURE 7 for any desired angular position of the vehicle corresponding to a predetermined zenith angle $\theta$ to determine the bucking voltage E$b$.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art. For example, the term "light" is used herein to denote any type radiation which obeys accurately the laws of geometrical optics and need not necessarily be visible light.

What is claimed is:

1. A light sensing device comprising light sensitive means providing electrical signals when exposed to light, said light sensitive means including a plurality of light sensitive elements arranged to receive light rays within a solid angle of substantially $2\pi$ steradians and a plurality of light sensitive elements arranged to receive light rays within a relatively small solid angle, said elements being connected to provide electrical signals corresponding to the attitude of the light sensing device relative to the light source.

2. A light sensing device comprising light sensitive means providing electrical signals when exposed to light, said light sensitive means including a plurality of light sensitive elements arranged to receive light rays over a substantial solid angle and a plurality of light sensitive elements arranged to receive light rays within a relatively small solid angle, a shaded for said first-mentioned light sensitive elements to shield the elements from the light source when the second-mentioned light sensitive elements receive light rays from the light source and the light sensing device is directed substantially toward the light source, said elements being connected to provide electrical signals corresponding to the attitude of the light sensing device relative to the light source.

3. A light sensing device comprising light sensitive means providing electrical signals when exposed to light, said light sensitive means including a plurality of light sensitive elements arranged to receive light rays over a substantial solid angle and a plurality of light sensitive elements arranged to receive light rays within a relatively small solid angle, a shade for said first-mentioned light sensitive elements to shield the elements from the light source when the second-mentioned light sensitive elements receive light rays from the light source and the light sensing device is directed substantially toward the light source, said elements being connected so that said first-mentioned elements provide electrical signals when the light sensing device is directed at a substantial angle to the light source and said second-mentioned elements provide electrical signals when the light sensing device is directed substantially toward the light source.

4. A light sensing device comprising light sensitive means providing electrical signals when exposed to light, said light sensitive means including a plurality of light sensitive elements arranged to receive light rays over a substantial solid angle and a plurality of light sensitive elements arranged to receive light rays within a relatively small solid angle, a shade for said first-mentioned light sensitive elements to shield the elements from the light source when the second-mentioned light sensitive elements receive light rays from the light source and the light sensing device is directed substantially toward the light source, said elements being connected so that said first-mentioned elements provide electrical signals when the light sensing device is directed at a substantial angle to the light source and said second-mentioned elements provide electrical signals when the light sensing device is directed substantially toward the light source, and said first- and second-mentioned elements providing electrical signals when the light sensing device is directed intermediate thereto.

5. A light sensing device comprising light sensitive means providing electrical signals when exposed to light, said light sensitive means including a plurality of light sensitive elements arranged to receive light rays within a substantial solid angle, and a plurality of light sensitive elements arranged to receive light rays within a relatively small solid angle, a shade for said first-mentioned light sensitive elements to shield the elements from the light source when the second-mentioned light sensitive elements receive light rays from the light source and the light sensing device is directed substantially toward the light source, said second-mentioned light sensitive elements being square in shape and receiving light rays through a square aperture to provide electrical signals substantially linearly related to the attitude of the sensing device relative to the light source within the relatively small solid angle, and groups of said first-mentioned elements and said second-mentioned elements being connected so that said first-mentioned elements provide electrical signals when the light sensing device is directed at a substantial angle to the light source and the second-mentioned elements provide electrical signals when the light sensing device is directed substantially toward the light source and said first- and second-mentioned elements provide electrical signals when the light sensing device is directed at an angle intermediate thereto.

6. A light sensing device comprising light sensitive means providing electrical signals when exposed to light, said light sensitive means including a plurality of light sensitive elements arranged to receive light rays within a substantial solid angle and a plurality of light sensitive elements arranged to receive light rays within a relatively small solid angle, said first-mentioned elements and second-mentioned elements being perpendicularly related to receive light rays, and groups of said first-mentioned elements and second-mentioned elements being connected in parallel opposition so that said first-mentioned elements provide electrical signals when the light sensing device is directed at a substantial angle to the light source and the second-mentioned elements provide electrical signals when the light sensing device is directed substantially toward the light source, and said first- and seond-mentioned elements provide electrical signals when the light sensing device is directed at an angle intermediate thereto.

7. A light sensing device comprising light sensitive means providing electrical signals when exposed to light, said light sensitive means including a plurality of light sensitive elements arranged octagonally to receive light rays within a solid angle of substantially two $\pi$ steradians and a plurality of light sensitive elements arranged to receive light rays within a relatively small solid angle, said second-mentioned light sensitive elements being square in shape and receiving light rays through a square aperture to provide electrical signals substantially linearly related to the attitude of the sensing device relative to the light source within the relatively small solid angle, and said elements being connected to provide electrical signals corresponding to the attitude of the light sensing device relative to the light source.

8. A light sensing device comprising light sensitive means providing electrical signals when exposed to light, said light sensitive means including a plurality of light sensitive elements arranged octagonally to receive light rays within a solid angle of substantially two $\pi$ steradians and a plurality of light sensitive elements arranged to receive light rays within a relatively small solid angle, said elements being connected to provide electrical signals corresponding to the attitude of the light sensing device relative to the light source.

9. A light sensing device comprising light sensitive means providing electrical signals when exposed to light, said light sensitive means including a plurality of light sensitive elements arranged to receive light rays over a substantial solid angle and a plurality of light sensitive elements arranged to receive light rays within a relatively small solid angle, said first-mentioned elements being perpendicularly related to said second-mentioned elements to receive light rays and being connected to provide electrical signals corresponding to the attitude of the light sensing device relative to the light source over a relatively large solid angle.

10. A light sensing device comprising light sensitive means providing electrical signals when exposed to light, said light sensitive means including a plurality of light sensitive elements arranged to receive light rays over a substantial solid angle and a plurality of light sensitive elements arranged to receive light rays within a relatively small solid angle, said second-mentioned light sensitive elements being substantially perpendicularly related to said first-mentioned light sensitive elements and being square in shape and receiving light waves through a square aperture to provide electrical signals substantially linearly related to the attitude of the sensing device relative to the light source within the relatively small solid angle, and said elements being connected to provide electrical signals corresponding to the attitude of the light sensing device relative to the light source within a substantial solid angle.

11. A light sensing device comprising light sensitive means providing electrical signals when exposed to light, said light sensitive means including a plurality of light sensitive elements arranged octagonally to receive light rays over a substantial solid angle and a plurality of light sensitive elements arranged to receive light rays within a relatively small solid angle, groups of said first-mentioned light sensitive elements and said second-mentioned light sensitive elements being connected in parallel opposition to provide electrical signals substantially linearly related to the attitude of the light sensing device relative to the light source.

12. A light sensing device comprising light sensitive means providing electrical signals when exposed to light, said light sensitive means including a plurality of light sensitive elements arranged octagonally to receive light rays within a solid angle of substantially two π steradians and a plurality of light sensitive elements arranged to receive light rays within a relatively small solid angle, a shade for said first-mentioned light sensitive elements to shade the elements from the light source when the second-mentioned light sensitive elements receive light rays from the light source and the light sensitive device is directed substantially toward the light source, said first-mentioned elements and said second-mentioned elements being perpendicularly related to receive light rays, said second-mentioned light sensitive elements being square in shape and receiving light rays through a square aperture to provide electrical signals substantially linearly related to the attitude of the sensing device relative to the light source within the relatively small solid angle, and groups of said first-mentioned elements and said second-mentioned elements being connected in parallel opposition so that said first-mentioned elements provide electrical signals when the light sensing device is directed at a substantial angle to the light source and the second-mentioned elements provide electrical signals when the light sensing device is directed substantially toward the light source and said first- and second-mentioned elements provide electrical signals when the light sensing device is directed at an angle intermediate thereto.

13. Means for controlling the attitude of a space vehicle from the sun, comprising a light sensing device including light sensitive means providing electrical signals when exposed to light, said light sensitive means including a plurality of light sensitive elements arranged to receive light rays over a substantial solid angle and a plurality of light sensitive elements arranged to receive light rays within a relatively small solid angle, said second-mentioned elements being substantially perpendicularly related to said first-mentioned elements and being connected to provide electrical signals corresponding to the attitude of the light sensing device relative to the sun, and means responsive to the signals for orienting the vehicle to a desired attitude.

14. Means for controlling the attitude of a space vehicle from the sun, comprising a light sensing device including light sensitive means providing electrical signals when exposed to light, said light sensitive means including a plurality of light sensitive elements arranged to receive light rays over a substantial solid angle and a plurality of light sensitive elements arranged to receive light rays within a relatively small solid angle, a shade for said first-mentioned light sensitive elements to shield the elements from the sun when the second-mentioned light sensitive elements receive light rays from the sun and the light sensing device is directed substantially toward the sun, said elements being connected to provide electrical signals corresponding to the attitude of the light sensing device relative to the sun, and means responsive to the signals for orienting the vehicle to a desired attitude.

15. Means for controlling the attitude of a space vehicle from the sun, comprising a light sensing device including light sensitive means providing electrical signals when exposed to light, said light sensitive means including a plurality of light sensitive elements arranged to receive light rays over a substantial solid angle and a plurality of light sensitive elements arranged to receive light rays within a relatively small solid angle, a shade for said first-mentioned light sensitive elements to shield the elements from the sun when the second-mentioned light sensitive elements receive light rays from the sun and the light sensing device is directed substantially toward the sun, said second-mentioned light sensitive elements being square in shape and receiving light rays through a square aperture to provide electrical signals substantially linearly related to the attitude of the sensing device relative to the sun within the relatively small solid angle, and groups of said first-mentioned elements and said second-mentioned elements being connected so that said first-mentioned elements provide electrical signals when the light sensing device is directed at a substantial angle to the sun and said second-mentioned elements provide electrical signals when the light sensing device is directed substantially toward the sun and said first- and second-mentioned elements provide electrical signals when the light sensing device is directed at an angle intermediate thereto, and means responsive to the signals for orienting the vehicle to a desired attitude.

16. A light sensing device comprising light sensitive means providing electrical signals when exposed to light, said light sensitive means including a plurality of light sensitive elements arranged to receive light rays within a solid angle of substantially two π steradians and a plurality of light sensitive elements arranged to receive light rays within a relatively small solid angle, said first-mentioned elements being substantially perpendicularly related to said second-mentioned elements to receive light rays and said elements being connected to provide electrical signals corresponding to the attitude of the light sensing device relative to the light source.

17. Means for controlling the attitude of one axis of a space vehicle relative to the sun, comprising a light sensing device including a plurality of light sensitive elements arranged to receive light rays over a substantial solid angle and being connected to provide electrical signals corresponding to the attitude of the axis relative to the sun when the light sensitive elements are unequally illuminated by light rays from the sun, means for providing a bucking signal opposing the signal from the light sensing device, and means responsive to the sum of the signals for orienting the vehicle so that the axis is in an attitude relative to the sun corresponding to the bucking signal, and means responsive to the light sensing device for detecting rotation of the vehicle about the axis.

18. Means for controlling the attitude of one axis of a space vehicle relative to the sun, comprising a light sensing device including a plurality of light sensitive elements arranged to receive light rays over a substantial solid angle and a plurality of light sensitive elements arranged to receive light rays within a relatively small solid angle, said elements being connected to provide electrical signals corresponding to the attitude of the axis relative to the sun when the light sensitive elements are unequally illuminated by light rays from the sun, means for providing a bucking signal opposing the signal from the light sensing device, and means responsive to the sum of the signals for orienting the vehicle so that the axis is in an attitude relative to the sun corresponding to the bucking signal, and means responsive to the light sensing device for detecting rotation of the vehicle about the axis.

19. Means for controlling rotation of a space vehicle about one axis relative to the sun, comprising a light sensing device including light sensitive means providing electrical signals when the axis is directed at an angle to the sun and providing zero signals when the axis is directed to the sun, means for maintaining said axis at an angle to the sun, said light sensitive means providing a varying output when the vehicle is rotating about the axis and providing a constant output when the vehicle is not rotating about the axis, and means responsive to the output for controlling rotation of the vehicle about the axis.

20. Means for controlling the attitude of one axis of a space vehicle relative to the sun, comprising a light sensing device including light sensitive means providing electrical signals when exposed to light, said light sensing device providing a predetermined output when the vehicle is positioned with the axis in a predetermined attitude relative to the sun, means for providing a bucking output corresponding to the predetermined output and opposing the electrical signals from the light sensing device, and means responsive to the bucking output and to the electrical signals for orienting the vehicle so that the axis is positioned in the predetermined attitude relative to the sun and means responsive to the light sensing device for detecting rotation of the vehicle about the axis.

References Cited by the Examiner

UNITED STATES PATENTS

| | | | |
|---|---|---|---|
| 2,155,402 | 4/1939 | Clark | 33—61 |
| 2,403,387 | 7/1946 | McLennan | 102—50 |
| 2,733,878 | 2/1956 | Ciscil | 244—17.13 |
| 2,797,379 | 6/1957 | Young | 244—77 X |

FOREIGN PATENTS 346,034  6/1960  Switzerland.

FERGUS S. MIDDLETON, *Primary Examiner.*

MILTON BUCHLER, *Examiner.*